Nov. 15, 1938.  J. M. ROBINSON  2,136,926
SCANNING DEVICE
Filed Feb. 5, 1936  3 Sheets-Sheet 1
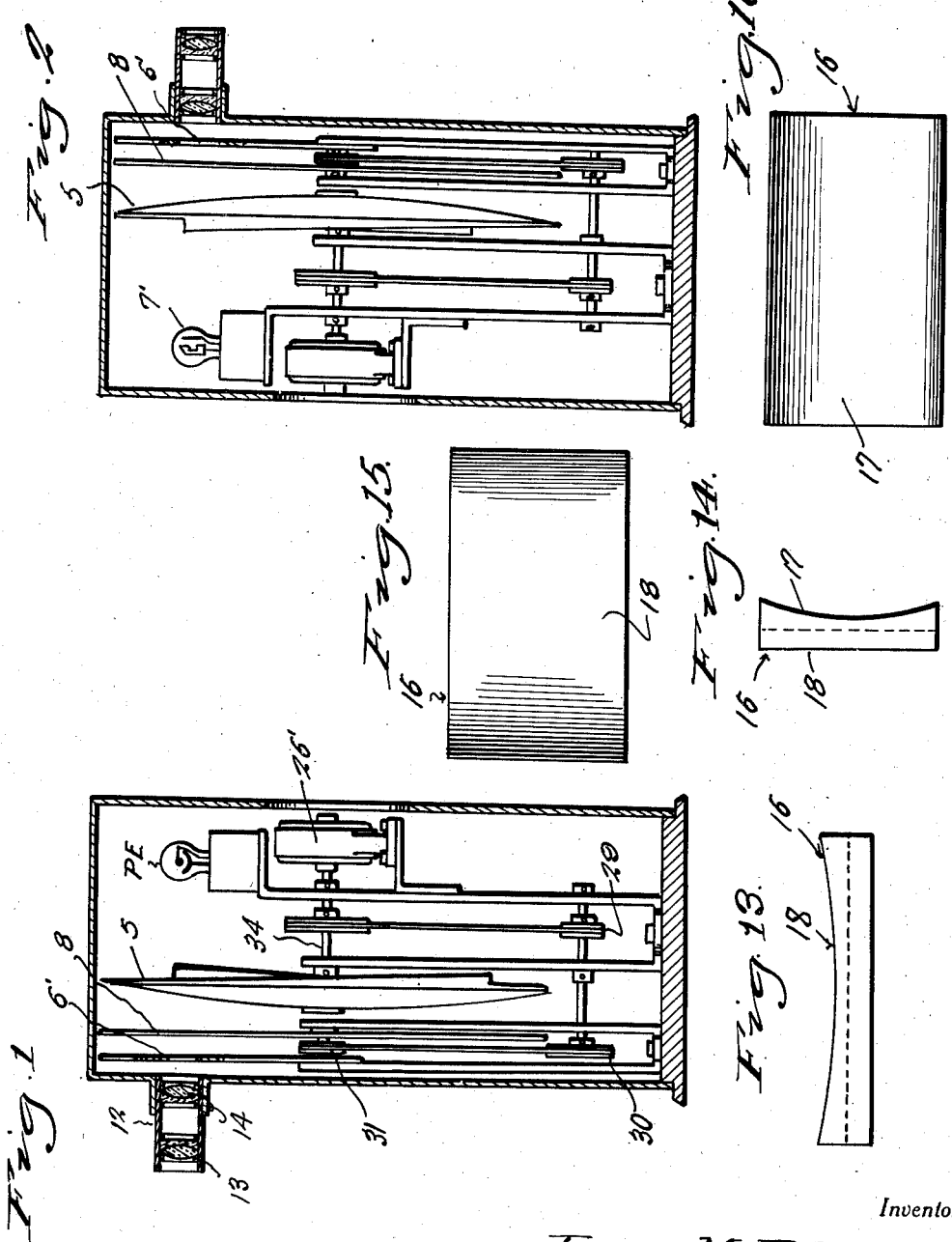
Inventor
James M. Robinson
By Clarence A. O'Brien and
Hyman Berman
Attorneys Nov. 15, 1938.                J. M. ROBINSON                 2,136,926
                              SCANNING DEVICE
                            Filed Feb. 5, 1936            3 Sheets-Sheet 2
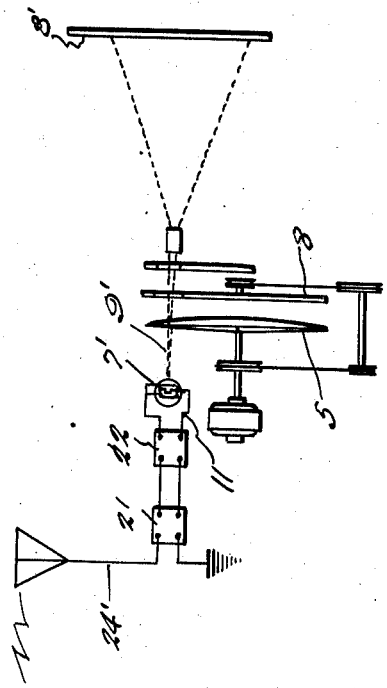
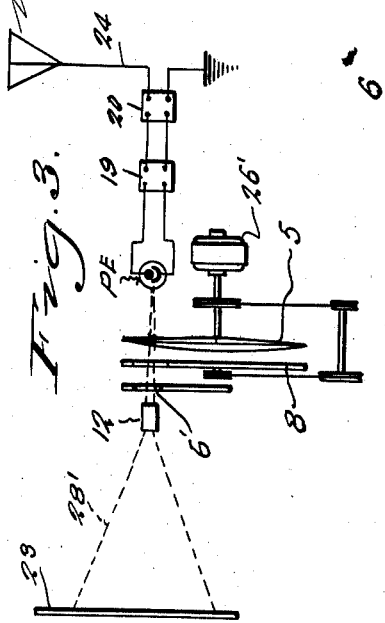
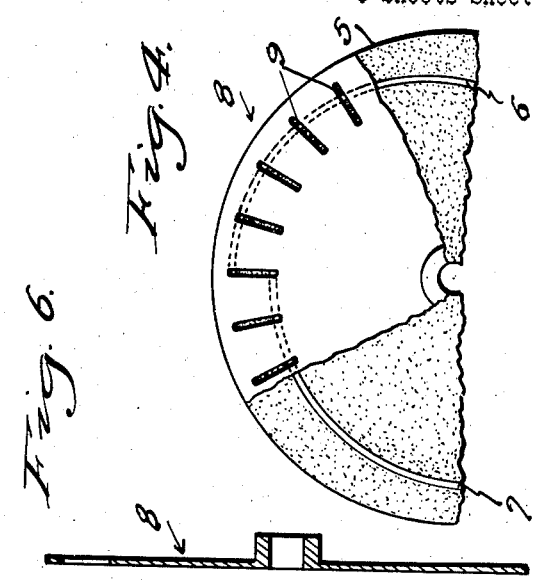
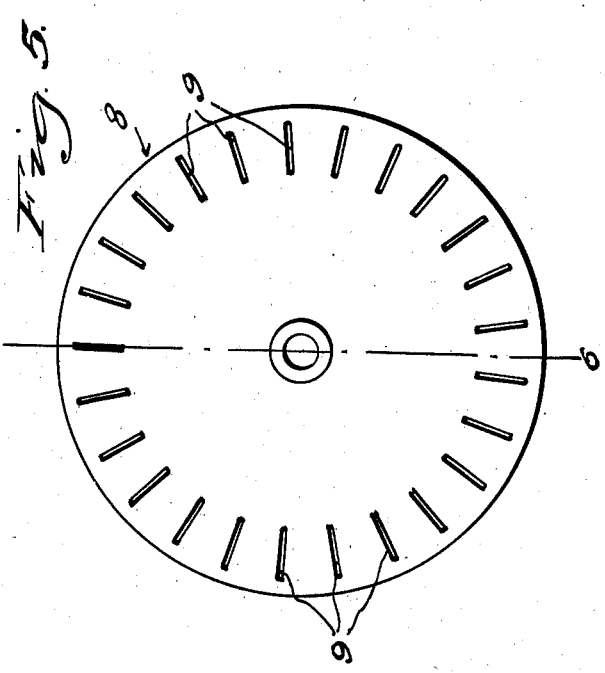
Inventor
James M. Robinson
By Clarence A. O'Brien and
   Hyman Berman  Attorneys

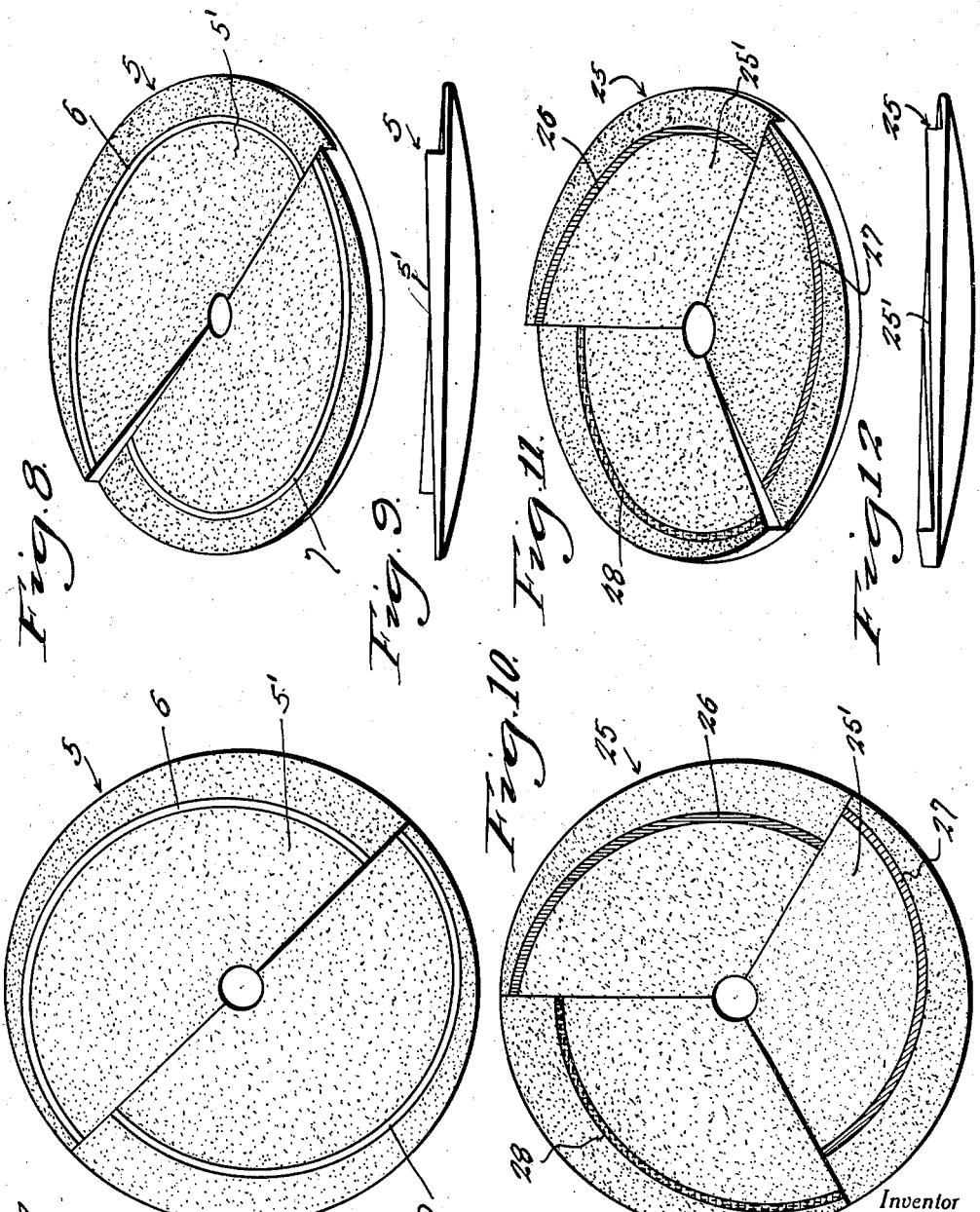

Patented Nov. 15, 1938

2,136,926

UNITED STATES PATENT OFFICE 2,136,926

SCANNING DEVICE

James Michael Robinson, Evansville, Ind.

Application February 5, 1936, Serial No. 62,537

2 Claims. (Cl. 178—7.6)

This invention relates to the art of transmitting, receiving and reproducing visual impressions by electrical or radio means commonly known as television. The main object of this invention is to provide an improved method of scanning, combined with an improved optical system, which allows a maximum amount of light to pass through the scanning apparatus and which controls the rays of light passing therethrough.

A further object of this invention is to provide a scanning apparatus which permits a greater number of picture elements to be registered without reducing the size of the picture.

A still further object of this invention is to provide a scanning apparatus and optical system whereby the natural colors of the object scanned will be faithfully reproduced.

The scanning apparatus and optical system hereinafter described and illustrated is simple in construction, inexpensive to manufacture and more efficient than other methods known to the art in that a higher degree of picture definition is obtained by producing a greater number of lines per picture. This system may also be used in connection with telephotography.

In the drawings:—

Figure 1 is a transverse vertical sectional view taken through the transmitting apparatus.

Figure 2 is a similar sectional view taken through the receiving apparatus.

Figure 3 is a diagrammatic representation of the mechanical and electrical relation between the transmitting and receiving apparatus, showing also the mechanical and optical arrangements in each apparatus.

Figure 4 is a sectional elevational view showing the relation of the radially slotted scanning disk to one of the spirally slotted lenses or prisms.

Figure 5 is an elevational view of the radially slotted scanning disk.

Figure 6 is a transverse vertical sectional view taken through Figure 5 approximately on the line 6—6.

Figure 7 is a plan or front view of the opaque scanning lense or disk utilizing two spiral transparent slots.

Figure 8 is a perspective view of Figure 7.

Figure 9 is an edge elevational view of Figure 8.

Figure 10 is a plan or front view of a scanning lens or disk utilizing three transparent spiral slots affording the primary colors for natural color work.

Figure 11 is a perspective view of Figure 10.

Figure 12 is an edge elevational view of Figure 11.

Figure 13 is a longitudinal edge view of the rectangular lens affording spherical segmental lens action.

Figure 14 is an end elevational view of Figure 13.

Figure 15 is a back elevational view of Figure 14.

Figure 16 is a front elevational view thereof.

Referring in detail to the drawings, the lens disk 5 shown in Figure 7 is rendered opaque except along two transparent spiral paths 6 and 7, by several different methods: either the entire surface of the disk may be coated with an opaque paint and then the desired portions removed to form the transparent spiral paths or a thin opaque disk containing slots or spiral perforations may be attached to the surface so as to become an integral part of disk lens 2, which is in reality a single spherical lens which may be of any desirable contour such as plano-convex, plano-concave, the plano surface being of varying contour which is in fact prismatic. The purpose of this disk lens (in combination with other parts and while in operation) is to determine the number of pictures or frames or visual impressions per second by causing the optical and mechanical axis of each of the spiral slots as they come in register to move across the picture aperture. This is accomplished by the prismatic effect of the disk revolving at a predetermined and comparatively slow speed.

In Fig. 5, the rotatable opaque disk 8, contains a plurality of slotted perforations 9 spaced radially and circumferentially and whose purpose is to determine the number of lines or rows of picture elements per picture when in coordination with disk lens 5 by successively intersecting the transparent spiral paths in the opaque coating on the disk lens 5. The disk 8 revolves at a speed much greater than that of disk lens 2.

In Figs. 1 and 3 is shown a suggested arrangement showing how this invention may be used in connection with a direct pick-up system of transmitting. The numeral 23 designates the object or scene being transmitted. The numeral 28 designates the reflected light rays from a very small portion of the object 23 which are picked up by lenses 13 and 14 in lens barrel 12 from whence they pass through picture aperture 6 then through scanning disk 8 which carries radially and circumferentially spaced slots 9 then through disk lens 5 which carries the spiral slots 6 and 7 contained in opaque coating whence said light rays are projected on to photo-electric cell PE.

In Figures 13, 14, 15 and 16 the numeral 16 is a rectangular cylindrical lens. The numerals 17 and 18 designate the concave surfaces at right angles or transverse relation to each other. This cylindrical lens is minus in dioptic strength and has the power of accumulating light rays reflected from a scene of a given area and projecting them in straight lines instead of concentrating the light rays at a focal point as in the case of a plus lens. Also, the image is upright instead of upside down as in a plus lens where the focal points of the rays cross, is suggested as a substitute for lenses 13 and 14 shown in Fig. 1.

In Figures 2 and 3 is shown a suggested arrangement in which this invention is used in the reproducing or receiving set. The numeral 8' in this figure designates a translucent screen. The numeral 11 designates the circuit wires connected to the output of a suitable radio receiving set. The numeral 7 is a crater type light source which emits light rays 9' onto the opaque disk 5. A portion of these light rays passes through the spiral slots of disk lens 5 or 25 thence through the slots 9 of the disk 8 then through picture aperture 6' or mask thence onto translucent screen 8'.

The lens disk 25 is designed to carry three transparent slots 26, 27, 28 in an opaque covering or attached disk, each slot being in one of the primary colors, that is to say, 26 will be colored red, 27 will be colored green, and 28 will be colored yellow.

Fig. 12 shows the cross-sectional contour of disk lens 25 to which the opaque coating or disk 25' is attached and which carries the spiral slots. The disk 25 varies in thickness and is in fact a prism.

Referring now to Figs. 1 and 3 a complete system for a broadcasting transmitter is shown. In Fig. 1, the object under observation or being televised is shown at 23, the reflected light rays from 23 are picked up by a lens contained in lens barrel 12, then pass through picture aperture 6' or mask thence through slotted apertures 9 in the scanning disk 8, then through disk lens 5 through spiral slot in opaque disk 5 or 25, and are then focused onto the sensitive plate of the photo-electric cell PE which converts the light rays into electrical impulses. These impulses are conducted to the amplifier 19 from whence they pass to oscillator 20 then into antenna system 24.

In Figures 2 and 3 a complete receiving apparatus is shown, the numeral 24' being the receiving antenna which receives the electrical impulses from radiating antenna system 24 which are carried by conductors to receiver 21 thence to amplifier 22, thence to light source 7 which converts the electrical impulses into light rays. These light rays are thrown onto disk lens 5 or 25 which carries opaque disk 25' with the spiral transparent paths, and a portion of these light rays pass through the transparent paths then through slots 9 of the scanning disk 8, then onto the translucent screen 8'.

In operation the following phenomena take place; disk lens 5 or 25 is rotated by motor 26' through shaft 34. The scanning disk 8 is also rotated by the motor 26' but at a much greater speed by means of a step up arrangement of gears or pulleys 29, 30 and 31. The image of the object 23 is sharply focused upon the disk lens 5 or 25 which is opaque except for the spiral paths. The disk lens being a prismatic spherical lens in itself has the same focal length at any point on its surface therefore the spiral paths have the same focal length at any given point and when the disk lens is in operation and rotating the optical axis is constantly moving in a vertical direction due to the prismatic effect of the back surface when the image of the object is focused on the disk lens above its mechanical center but when focused to the right or to the left of its mechanical center the optical axis will appear to move in a horizontal direction now, while the disk lens is rotating and causing the optical axis to move for example in a vertical direction say from top to bottom the scanning disk 8 which carries a plurality of rectangular slots 9 the same width as the spiral paths contained in or on disk lens 5, is also rotating in such a manner that each of the slots 9 intersect the light rays passing to and through the spiral paths. The slots 9 are so arranged that only one slot is in register before the picture aperture at any one time, this action causes a small portion of spiral path to become in effect a small square shaped spherical lens with its optical axis moving at great speed in a horizontal direction and at the same time downward in a vertical direction at a comparative slow speed. It is intended that the two scanning disks 8 and 5 revolve at predetermined speeds and at such a ratio to each other that while one slot 9 in disk 8 in passing across the picture aperture the focal point of disk lens 5 will have moved downward the distance equivalent to its own width. This scanning action when lens 5 is focused on objective lens 14 causes the image of object 23 to be dissected into horizontal lines and as the optical focal point of lens 5 moves across the picture the reflected rays of light from object 23 are registered on a light sensitive cell commonly known as a photo-electric cell, these reflected rays of light are constantly varying according to their color values in black and white and are converted into electrical impulses corresponding directly to the brilliancy of the light rays. These minute electrical impulses are greatly amplified before passing to the transmitting equipment and radiating or antenna system. The above description covers what is known as the direct pickup method and is intended especially for outdoor scenes such as current events and athletic contests. Another method known as the flying spot is similar to the above excepting that a light source such as a carbon arc or stereopticon incandescent lamp is substituted for the light sensitive photo-electric cell and a plurality of photo-electric cells are placed in front of the televisor and facing object 23. With this method it is necessary that the room or studio be darkened. In operation this system would function as follows: Rays of light from the light source would be directed again rotating disk lens 5 the spiral paths thereon would allow a portion of the light to pass through to rotating scanning disk 8 which contains slots 9 in register with transparent paths on disk lens 5 which would cause a small square shaped spherical lens to be formed which projects the image of the light source onto the projection lens 13 and 14 which in turn projects a very small brilliant spot of light which travels in successive lines across the entire subject or object 23 which is being televised. As this spot of light passes across the subject it is reflected back to the photo-electric cells, the white portions of the subject reflecting the most light, the neutral portions less light and the black portions reflecting practically no light. As in the first described system these light variations as reflected on the photoelectric cells are transformed into corresponding electrical variations or impulses which are amplified and transmitted as above described.

The foregoing description pertains entirely to broadcasting or transmission of pictures both still and moving, directly from living objects or from transparencies or films.

In order to reproduce visual impressions this invention is used as shown in Figures 2 and 3 to wit: The electrical impulses emitted by the transmitting equipment shown in Fig. 1 and described above, are received by antenna 24' and radio receiver 21, amplified by amplifier 22 as shown in Fig. 1, then conveyed to output circuit 11, to light source 7 which is capable of interpreting or transforming each electrical impulse into light variations in accordance with the signal strength of each impulse. In the receiver the light source 7' is shown as a crater type neon lamp but in practice this may be substituted by any suitable light source such as an arc light or an incandescent exciter lamp the constant output of which may be controlled by a Kerr cell or other suitable light valve. The fluctuating light rays 9' are projected upon the rotating opaque disk 5 or 25 which allows a portion of the rays to pass through the spiral slots contained therein, thence through rotating disk lens 5 or 25 onto rotating scanning disk 8 containing radial slots 9 which cause the pulsating light rays or beam to move in a horizontal direction across the translucent screen 8', each successive line thus produced being adjacent to the one immediately preceding and directly below same. In this manner as the scanning beam travels across the screen 8' in successive horizontal lines the light source 7' is flashing in accordance with the electrical impulses received from transmitter, thus rebuilding the image of object 23 by means of minute light and dark elements in exact sequence as defined by the scanning system of the transmitter.

A very novel feature of this invention is that by substituting the opaque disk 25 shown in Figures 10, 11 and 12 for disk 5 shown in Figures 7, 8 and 9 (in both the transmitter and the reproducer) visual impressions, of the subject or object, will be discerned in, what will appear to be, to the human eye, natural colors. The opaque disk 25' attached to disk 25, contains three spiral colored slots instead of two uncolored as contained by the disk 5' attached to disk 5, each of these three colored slots being in one of the three prime colors namely red, green and yellow. In operation in order to produce the same number of pictures or frames per second as produced by disk 5, the disk 25 will necessarily have to rotate at a speed twice as fast, because it must scan each of the three colored slots the same number of times and all of them in the same elapsed time as it ordinarily would scan one of the transparent uncolored slots contained on disk 5. In operation as the object is being scanned by one of the primary colors, that particular color will be filtered out and only its complement or opposite color or shades of color containing its complement will be allowed to pass to the light sensitive cell. The object is scanned by each of the colored slots so rapidly and at the receiving end the screen is being traversed by the point of light controlled by electrical impulses and a scanning disk identical to and rotating at the same speed and in perfect synchronism with the one at the transmitter, that the colors thus reproduced create the sensation to the eye of being chemically mixed, therefore an optical illusion is produced and the observer sees the picture in what appears to be natural colors.

Although I have shown and described herein preferred embodiments of my invention, it is to be definitely understood that I do not desire to limit the application of the invention thereto, and any change or changes may be made in the materials, and in the structure and arrangement of the parts, and in the sequence and duration of steps and operations in the manipulation thereof, within the spirit of the invention and the scope of the subjoined claims.

What is claimed is:—

1. In a television apparatus and optical system, a scanning device having a pair of rotary scanning disks in combination, one of said scanning disks having a plurality of radial slots spaced circumferentially thereabout and the other disk being of transparent material in the form of a lens of uniform optical strength, said lens having its surface rendered opaque except for three spiral paths thereon, each of said paths having a transparent coating of one of the three primary colors, said scanning disks being mounted in such a manner that the radial slots will intersect the spiral paths, and means for rotating said scanning disks in predetermined ratio to the other from a common power source.

2. In a television apparatus and optical system, a scanning device having a pair of rotary scanning disks in combination, one of said scanning disks having a plurality of radial slots spaced circumferentially thereabout and the other disk being of transparent material in the form of a spherical lens of uniform optical strength, said lens having its surface rendered opaque except for three spiral paths thereon, each of said paths having a transparent coating of one of the three primary colors, said scanning disks being mounted in such a manner that the radial slots will intersect the spiral paths, and means for rotating said disks at a predetermined ratio of speed relative to each other.

JAMES MICHAEL ROBINSON.